US012793188B2

(12) United States Patent
Li et al.

(10) Patent No.: US 12,793,188 B2
(45) Date of Patent: Nov. 10, 2026

(54) METHOD OF AND APPARATUS FOR PROCESSING DIGITAL IMAGE DATA

(71) Applicant: Robert Bosch GmbH, Stuttgart (DE)

(72) Inventors: Yumeng Li, Tuebingen (DE); Anna Khoreva, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 18/485,981

(22) Filed: Oct. 12, 2023

(65) Prior Publication Data

US 2024/0135515 A1 Apr. 25, 2024

(30) Foreign Application Priority Data

Oct. 17, 2022 (EP) .................................... 22201999

(51) Int. Cl.
*G06K 9/62* (2022.01)
*G06T 5/77* (2024.01)
(Continued)

(52) U.S. Cl.
CPC .............. *G06T 5/77* (2024.01); *G06T 7/0002* (2013.01); *G06V 10/7715* (2022.01);
(Continued)

(58) Field of Classification Search
CPC ..................... G06T 5/77; G06T 7/0002; G06T 2207/20021; G06T 2207/20081; G06T 2207/20084; G06T 2207/30168; G06T 5/60; G06T 5/70; G06T 11/00; G06T 2207/10016; G06T 2207/10024; G06T 2207/10132; G06T 7/00; G06V 10/7715; G06V 10/774; G06V 10/82; G06N 3/045; G06N 3/0464; G06N 3/0475; G06N 3/088; G06N 3/096; G06N 3/0455; G06N 3/094; G01S 17/89
See application file for complete search history.

(56) References Cited

U.S. PATENT DOCUMENTS 12,136,151 B2 * 11/2024 Epstein .................. G06T 11/60
2021/0118099 A1 * 4/2021 Kearney ............. A61B 6/5217
(Continued)

OTHER PUBLICATIONS

Zhang et al., "Radar HRRP Data Augmentation Using CVAE With Extended Latent Space Distribution," 2021 IEEE 4th Advanced Information Management, Communicates, Electronic and Automation Control Conference (IMCEC), 2021, pp. 1346-1354.
(Continued)

*Primary Examiner* — Xin Jia
(74) *Attorney, Agent, or Firm* — NORTON ROSE FULBRIGHT US LLP

(57) ABSTRACT

A computer-implemented method of processing digital image data. The method includes: determining, by an encoder configured to map a first digital image to an extended latent space associated with a generator of a generative adversarial network, GAN, system, a noise prediction associated with the first digital image, determining, by the generator of the GAN system, at least one further digital image based on the noise prediction associated with the first digital image and a plurality of latent variables associated with the extended latent space.

18 Claims, 11 Drawing Sheets

(51) Int. Cl.

| | |
|---|---|
| ***G06T 7/00*** | (2017.01) |
| ***G06V 10/77*** | (2022.01) |
| ***G06V 10/774*** | (2022.01) |
| ***G06V 10/82*** | (2022.01) |

(52) U.S. Cl.
CPC ............ *G06V 10/774* (2022.01); *G06V 10/82* (2022.01); *G06T 2207/20021* (2013.01); *G06T 2207/20081* (2013.01); *G06T 2207/20084* (2013.01); *G06T 2207/30168* (2013.01)

(56) References Cited

U.S. PATENT DOCUMENTS

| | | | | |
|---|---|---|---|---|
| 2022/0122305 | A1* | 4/2022 | Smith | G06F 3/04845 |
| 2022/0277431 | A1 | 9/2022 | Tensmeyer et al. | |
| 2023/0100413 | A1* | 3/2023 | Zhu | G06T 7/11 375/240.18 |

OTHER PUBLICATIONS

Wulff et al., "Improving Inversion and Generation Diversity in Stylegan Using a Gaussianized Latent Space," Cornell University, 2020, pp. 1-16.

Kaust et al., "Image2StyleGan: How to Embed Images Into the Stylegan Latent Space?," 2019 IEEE/CVF International Conference on Computer Vision (ICCV), 2019, pp. 4431-4440.

Preechakul et al., "Diffusion Autoencoders: Toward a Meaningful and Decodable Representation," VISTEC—Vidyasirimedhi Institute of Science and Technology, 2022, pp. 1-20.

Richardson et al., "Encoding in Style: a Stylegan Encoder for Image-To-Image Translation," Proceedings of the IEEE/CVF Conference on Computer Vision and Pattern Recognition (CVPR), 2021, pp. 2287-2296. <https://openaccess.thecvf.com/content/CVPR2021/papers/Richardson_Encoding_in_Style_A_StyleGAN_Encoder_for_Image-to-Image_Translation_CVPR_2021_paper.pdf> Downloaded Oct. 12, 2023.

Karras et al., "Analyzing and Improving the Image Quality of Stylegan," 2020 IEEE/CVF Conference on Computer Vision and Pattern Recognition (CVPR), 2020, pp. 8107-8116. <https://sci-hub.ru/10.1109/cvpr42600.2020.00813> Downloaded Oct. 12, 2023.

Zhang et al., "The Unreasonable Effectiveness of Deep Features as a Perceptual Metric," 2018 IEEE/CVF Conference on Computer Vision and Pattern Recognition, 2018, pp. 586-595. <https://sci-hub.ru/10.1109/cvpr.2018.00068> Downloaded Oct. 12, 2023.

Goodfellow et al., "Generative Adversarial Nets," Advances in Neural Information Processing Systems, Neurips, 2014, pp. 1-9. <https://proceedings.neurips.cc/paper_files/paper/2014/file/5ca3e9b122f61f8f06494c97b1afccf3-Paper.pdf> Downloaded Oct. 12, 2023.

Yao et al., "Feature-Style Encoder for Style-Based GAN Inversion," Conference on Computer Vision and Pattern Recognition, CVPR, 2022, pp. 1-25. <https://xu-yao.github.io/files/Feature_Style_Encoder_for_Style_Based_GAN_Inversion_arxiv.pdf> Downloaded Oct. 12, 2023.

Lin et al., "Feature Pyramid Networks for Object Detection," 2017 IEEE Conference on Computer Vision and Pattern Recognition, 2017, pp. 936-944. <https://sci-hub.ru/10.1109/cvpr.2017.106> Downloaded Oct. 12, 2023.

Abdal, et al.: "Image2StyleGAN: How to Embed Images Into the StyleGAN Latent Space?", 2019 IEEE/CVF International Conference on Computer Vision (ICCV), (2019), pp. 4431-4440, XP033723130.

* cited by examiner

METHOD OF AND APPARATUS FOR PROCESSING DIGITAL IMAGE DATA

CROSS REFERENCE

The present application claims the benefit under 35 U.S.C. § 119 of European Patent Application No. EP 22 20 1999.4 filed on Oct. 17, 2022, which is expressly incorporated herein by reference in its entirety.

FIELD

The present invention relates to a method of processing digital image data.

The present invention further relates to an apparatus for processing digital image data.

Generative adversarial networks, GAN, are described in the related art and characterize an approach of generative modeling which can, e.g., be used to generate image data.

SUMMARY

Exemplary embodiments of the present invention relate to a method, for example a computer-implemented method, of processing digital image data, comprising: determining, by an encoder configured to map a first digital image to an extended latent space associated with a generator of a generative adversarial network, GAN, system, a noise prediction associated with the first digital image, determining, by the generator of the GAN system, at least one further digital image based on the noise prediction associated with the first digital image and a plurality of latent variables associated with the extended latent space. In some exemplary embodiments, this may enable to determine, e.g., generate, further digital images comprising a similar or identical content as the first digital image, but, optionally, with a modified style, as, e.g., characterized by at least some of the plurality of latent variables.

In some exemplary embodiments of the present invention, the digital image data and/or the (first) digital image may comprise at least one of, but is not limited to: a) at least one digital image, b) an image or frame of a video stream, c) data associated with a RADAR system, e.g. imaging RADAR system, e.g. RADAR image, c) data associated with a LIDAR system, e.g. LIDAR image, d) an ultrasonic image, e) a motion image, f) a thermal image, e.g. as obtained from a thermal imaging system.

In some exemplary embodiments of the present invention, at least some of the plurality of latent variables associated with the extended latent space characterize at least one of the following aspects of the first digital image: a) a style, e.g. a non-semantic appearance, b) a texture, c) a color. In some exemplary embodiments, a style of a digital image may be characterized by a combination of a texture of at least some parts of the digital image and a color of at least some parts of the digital image.

In some exemplary embodiments of the present invention, the method comprises determining the plurality of latent variables based on at least one of: a) a second digital image, which is different from the first digital image, e.g. using the encoder, b) a plurality of probability distributions, as may e.g. be obtained based on a data set in some exemplary embodiments.

In some exemplary embodiments of the present invention, the method comprises at least one of: a) determining a plurality of, for example hierarchical, feature maps based on the first digital image, b) determining a plurality of latent variables associated with the extended latent space for the first digital image based on the plurality of, for example hierarchical, feature maps, c) determining a, for example additive, noise map based on at least one of the plurality of, for example hierarchical, feature maps.

In some exemplary embodiments of the present invention, the method comprises: randomly and/or pseudo-randomly masking at least a portion of the noise prediction associated with the first digital image. Note that according to further exemplary embodiments, the masking is not required for modifying a style, e.g. for style augmentation, according to the principle according to the embodiments.

In some exemplary embodiments of the present invention, the method comprises: masking of the noise map, e.g. in a random and/or pseudo-random fashion.

In some exemplary embodiments of the present invention, the method comprises: dividing, e.g. spatially dividing, the noise map into a plurality of, e.g. P×P many, e.g. non-overlapping, patches, selecting, in a random and/or pseudo-random fashion, a subset of the patches, replacing the subset of the patches by patches of, e.g. unit Gaussian, random variables, e.g. of the same size.

In some exemplary embodiments of the present invention, the method comprises: combining the noise prediction associated with the first digital image with a style prediction of a or the second digital image, generating a further digital image using the generator based on the combined noise prediction associated with the first digital image and the style prediction of the second digital image. In some exemplary embodiments, this enables to provide the further digital image with the style, or, for example, with at least some aspects of the style, of the second digital image, and, e.g., with the content of the first digital image.

In some exemplary embodiments of the present invention, the method comprises: providing the noise prediction associated with the first digital image, providing different sets of latent variables characterizing different styles to be applied to a, for example semantic, content of the first digital image, generating a plurality of digital images with the different styles using the generator based on the noise prediction associated with the first digital image and the different sets of latent variables characterizing the different styles.

In some exemplary embodiments of the present invention, the method comprises: providing image data, e.g. comprising one or more digital images, associated with a first domain, providing image data, e.g. comprising one or more digital images, associated with a second domain, applying a style of the second domain to the image data associated with the first domain.

In some exemplary embodiments of the present invention, the image data associated with the first domain comprises labels, wherein, for example, the applying of the style of the second domain to the image data associated with the first domain comprises preserving the labels. This way, a style of the digital images of the first domain may be modified while at the same time preserving the labels, thus providing further labeled image data with different style(s).

In some exemplary embodiments of the present invention, the method comprises: providing first image data having first content information, providing second image data, wherein for example the second image data comprises second content information different from the first content information, extracting style information of the second image data, applying at least a part of the style information of the second image data to the first image data.

In some exemplary embodiments of the present invention, the method comprises: generating training data, e.g. for training at least one neural network and/or machine learning system, wherein the generating is e.g. based on image data of a source domain and based on modified image data of the source domain, wherein, for example, the modified image data is and/or has been modified with respect to an image style, e.g. according to the principle of the embodiments, for example based on a style of further image data, and, optionally, training the at least one neural network system based on the training data.

Further exemplary embodiments of the present invention relate to an apparatus for performing the method according to the embodiments of the present invention.

Further exemplary embodiments of the present invention relate to a computer program comprising instructions which, when the program is executed by a computer, cause the computer to carry out the method according to the embodiments of the present invention.

Further exemplary embodiments of the present invention relate to a computer-readable storage medium comprising instructions which, when executed by a computer, cause the computer to carry out the method according to the embodiments of the present invention.

Further exemplary embodiments of the present invention relate to a data carrier signal carrying and/or characterizing the computer program according to the embodiments of the present invention.

Further exemplary embodiments of the present invention relate to a use of the method according to the embodiments and/or of the apparatus according to the embodiments and/or of the computer program according to the embodiments and/or of the computer-readable storage medium according to the embodiments and/or of the data carrier signal according to the embodiments for at least one of: a) determining at least one further digital image based on the noise prediction associated with the first digital image and a plurality of latent variables associated with the extended latent space, at least some of the plurality of latent variables being associated with another image and/or other data than the first digital image, b) transferring a style from a second digital image to the first digital image, e.g. while preserving a content of the first digital image, c) disentangling style and content of at least one digital image, d) creating different stylized digital images with unchanged content, e.g. based on the first digital image and a style of at least one further, e.g. second, digital image, e) using, e.g. re-using, labelled annotations for stylized images, f) avoiding annotation work when changing a style of at least one digital image, g) generating, e.g. perceptually realistic, digital images, e.g. with different styles, h) providing proxy validation set, e.g. for testing out-of-distribution generalization, e.g. of a neural network system, i) training a machine learning system, j) testing a machine learning system, k) verifying a machine learning system, l) validating a machine learning system, m) generating training data, e.g. for a machine learning system, n) data augmentation, e.g. of existing image data, o) improving a generalization performance of a machine learning system, p) manipulating, e.g. flexibly manipulate, image styles, e.g. without a training associated with multiple data sets, q) utilizing an encoder GAN pipeline to manipulate image styles, r) embedding, by the encoder, information associated with an image style into, for example intermediate, latent variables, s) mixing styles of digital images, e.g. for generating at least one further digital image comprising a style based on the mixing.

Some exemplary embodiments of the present invention will now be described with reference to the figures.

DETAILED DESCRIPTION OF EXAMPLE EMBODIMENTS

Figure 1:
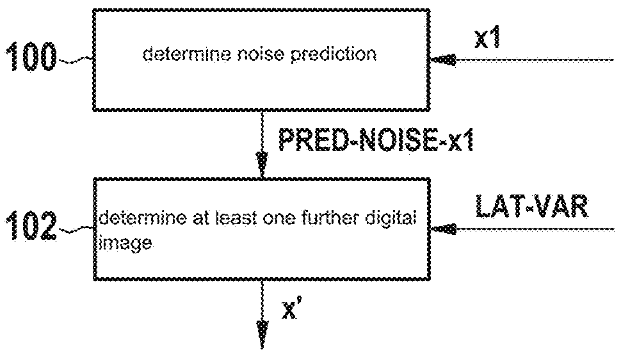
FIG. 1 schematically depicts a simplified flow-chart according to exemplary embodiments of the present invention.
Figure 2:
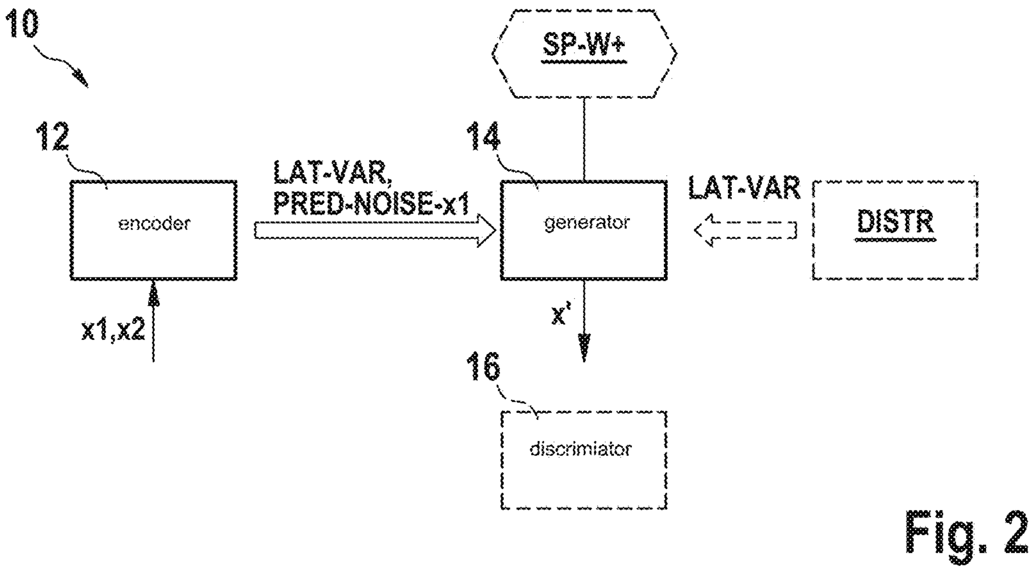
FIG. 2 schematically depicts a simplified block diagram according to exemplary embodiments of the present invention.

Exemplary embodiments, see, for example, FIG. 1, 2, relate to a method, for example a computer-implemented method, of processing digital image data, e.g. associate with at least one digital image, comprising: determining 100 (FIG. 1), by an encoder 12 (FIG. 2) configured to map a first digital image x1 to an extended latent space SP-W+ associated with a generator 14 of a generative adversarial network, GAN, system 10, a noise prediction PRED-NOISE-x1 associated with the first digital image x1, determining 102 (FIG. 1), by the generator 14 of the GAN system 10, at least one further digital image x' based on the noise prediction PRED-NOISE-x1 associated with the first digital image x1 and a plurality LAT-VAR of latent variables associated with the extended latent space SP-W+. In some exemplary embodiments, this may enable to determine, e.g. generate, further digital images x' comprising a similar or identical content as the first digital image x1, but, optionally, with a modified style, as e.g. characterized by at least some of the plurality of latent variables.

In some exemplary embodiments, the digital image data and/or the (first) digital image x1 may comprise at least one of, but is not limited to: a) at least one digital image, b) an image or frame of a video stream, c) data associated with a RADAR system, e.g. imaging RADAR system, e.g. RADAR image, c) data associated with a LIDAR system, e.g. LIDAR image, d) an ultrasonic image, e) a motion image, f) a thermal image, e.g. as obtained from a thermal imaging system.

In some exemplary embodiments, at least some of the plurality LAT-VAR of latent variables associated with the extended latent space SP-W+ characterize at least one of the following aspects of the first digital image: a) a style, e.g. a non-semantic appearance, b) a texture, c) a color. In some exemplary embodiments, a style of a digital image may be characterized by a combination of a texture of at least some parts of the digital image and a color of at least some parts of the digital image.

Figure 3:
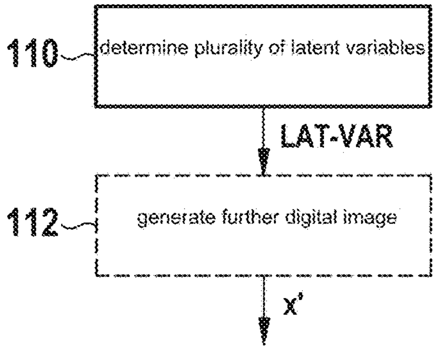
FIG. 3 schematically depicts a simplified flow-chart according to exemplary embodiments of the present invention.

In some exemplary embodiments, FIG. 3, the method comprises: determining 110 the plurality LAT-VAR of latent variables, e.g. specific values of the plurality LAT-VAR of latent variables, based on at least one of: a) a second digital image x2 (FIG. 2), which is different from the first digital image x1, e.g. using the encoder 12 of the GAN system 10, b) a plurality of probability distributions DISTR, as may e.g. be obtained based on a data set (not shown) in some exemplary embodiments. The optional block 112 of FIG. 3 symbolizes using the plurality LAT-VAR of latent variables, e.g. the specific values of the plurality LAT-VAR of latent variables, e.g. for generating a the further digital image x', e.g. using the generator 14.

In some exemplary embodiments, the GAN system 10 may comprise an optional discriminator 16, which, in some further exemplary embodiments, may e.g. be used for training at least one component of the of the GAN system, as is conventional in the art.

Some exemplary embodiments may make use of aspects of GAN inversion, which is related to finding, e.g. determining, latent variables in a latent space of a, for example pretrained, GAN, e.g. the GAN system 10 of FIG. 2, which, in some exemplary embodiments, can e.g. be used by the GAN system 10 to, e.g. faithfully, reconstruct a given image.

In some exemplary embodiments, the generator 14 of the GAN system 10 is configured and/or trained to generate digital images, e.g. photorealistic digital images, from latent variables, such as e.g. random (or pseudorandom) latent variables.

In some exemplary embodiments, the GAN system 10 of FIG. 2 may comprise a mapping network (not shown in FIG. 2) and may be configured to map a random latent vector, which may e.g. be denoted with $z \in \mathcal{Z}$, to intermediate "styles" latent variables, e.g., $w \in \mathcal{W}$, which in some exemplary embodiments may be used, e.g. to modulate features, e.g. at different resolution blocks.

In some exemplary embodiments, e.g. in addition to "styles", spatial stochastic noise that is e.g. randomly sampled, e.g. from a Gaussian distribution, may be added, e.g. after at least one, e.g. some, e.g. each, feature modulation(s).

In some exemplary embodiments, the encoder 12 (FIG. 2) is configured, e.g. trained, to predict spatial noises, e.g. along with "style" latents in the extended latent space SP-W+ ("$\mathcal{W}^+$ space"), which, in some exemplary embodiments, can be considered as an extension of the latent space $\mathcal{W}$.

In some exemplary embodiments, in the $\mathcal{W}^+$ space, "styles" at different layers may e.g. be different. In some exemplary embodiments, a, for example properly, trained encoder 12, e.g. trained by randomly masking out noise according to some exemplary embodiments, can disentangle texture and structure information, e.g. in an unsupervised way. More specifically, in some exemplary embodiments, the encoder 12 will encode texture information into "style" latents (latent variables) and content information into noise(s). Note, however, that according to further exemplary embodiments, the masking is not (necessarily) required for modifying a style, e.g. for style augmentation, according to the principle according to the embodiments. In other words, in some exemplary embodiments, style mixing, e.g. style augmentation, can e.g. be performed without masking.

In some exemplary embodiments, e.g. given a pretrained generator G (such as e.g. generator 12 of FIG. 2) of one GAN model, e.g. GAN system 10, which e.g. learns the mapping: $\mathcal{Z} \rightarrow \chi$, GAN inversion aims to map a given, e.g. digital, image x back to its latent representation z. Formally, it can be described as follows:

$$z^* = \underset{z}{\operatorname{argmin}}\, d(G(z), x)$$

where d(•) is a distance metric, e.g. to measure a similarity between the original image x and reconstructed image G(z).

In some exemplary embodiments, L2 and LPIPS (as e.g. defined by arXiv:1801.03924v2 [cs.CV] 10 Apr. 2018) can be jointly used as the distance metric d(•).

In some exemplary embodiments, the extended (intermediate) latent space $\mathcal{W}^+$ encourages a comparatively good reconstruction quality. In some exemplary embodiments, e.g. in addition to intermediate latents prediction, spatial noises may be predicted as well, which, in some exemplary embodiments, can e.g. better preserve detail information in a given image. In some exemplary embodiments, formally, the Encoder E and Generator G can be described as follows:

$$\{w, \varepsilon\} = E(x),$$

$$x^* = G(w, \varepsilon),$$

wherein x and x* are the given original image and the reconstructed image, respectively, wherein w characterizes predicted intermediate latent variables, and wherein ε characterizes predicted noises. In some exemplary embodiments, the encoder may e.g. be trained to, e.g. faithfully, reconstruct the given image x.

Figure 4:
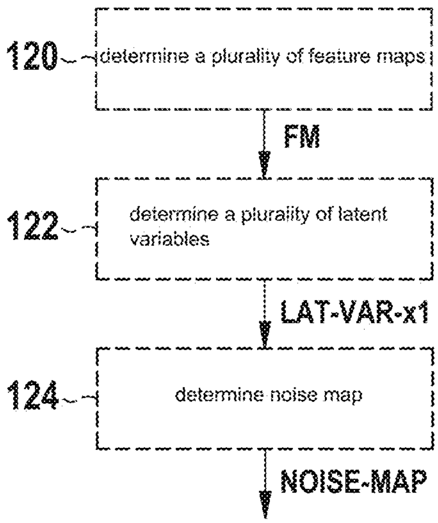
FIG. 4 schematically depicts a simplified flow-chart according to exemplary embodiments of the present invention.

In some exemplary embodiments, FIG. 4, the method comprises at least one of: a) determining 120 a plurality of, for example hierarchical, feature maps FM based on the first digital image x1, b) determining 122 (FIG. 4) a plurality of latent variables LAT-VAR-x1 (e.g., values of the plurality of latent variables LAT-VAR-x1) associated with the extended latent space SP-W+ (FIG. 2) for the first digital image x1 based on the plurality of, for example hierarchical, feature maps FM, c) determining 124 *a*, for example additive, noise map NOISE-MAP based on at least one of the plurality of, for example hierarchical, feature maps FM.

Figure 5:
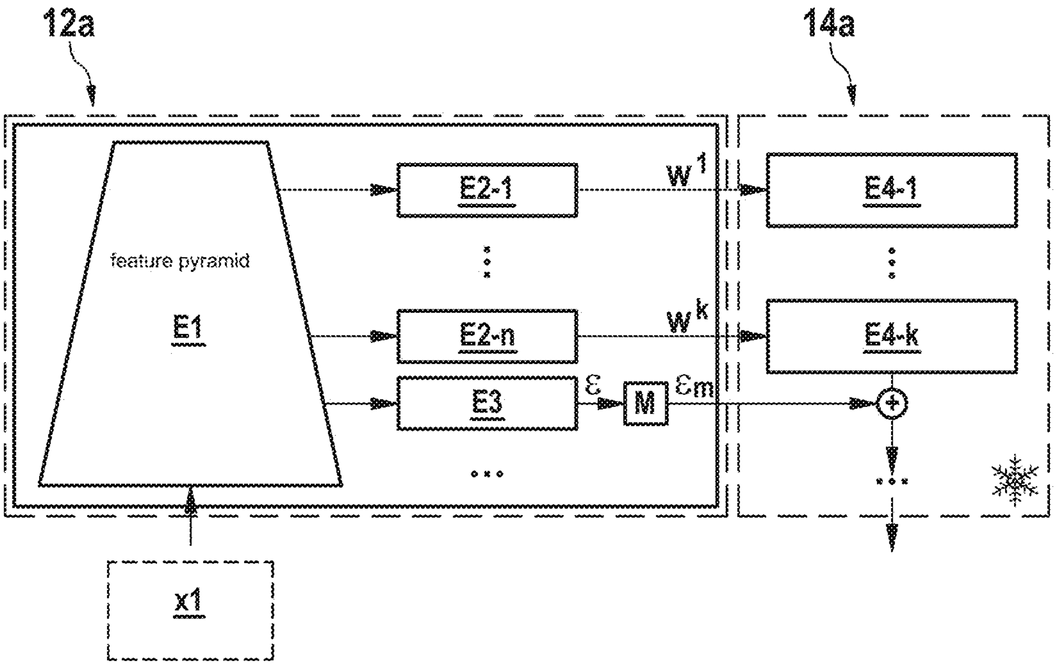
FIG. 5 schematically depicts a simplified block diagram according to exemplary embodiments of the present invention.

FIG. 5 schematically depicts aspects of the GAN system 10 (FIG. 2) according to some exemplary embodiments. Element 12*a* symbolizes an encoder, e.g. similar to encoder 12 of FIG. 2. In some exemplary embodiments, encoder 12 of FIG. 2 may comprise the configuration of encoder 12*a* of FIG. 5. Element 14*a* symbolizes a generator, e.g. similar to generator 14 of FIG. 2. In some exemplary embodiments, generator 14 of FIG. 2 may comprise the configuration of generator 14*a* of FIG. 5. Element 14*a* symbolizes a generator, e.g. similar to generator 14 of FIG. 2.

Element E1 symbolizes a feature pyramid according to some exemplary embodiments, which is e.g. configured to perform the step of determining 120 a plurality of, for example hierarchical, feature maps FM based on the first digital image x1, see block 120 of FIG. 4. In other words, in some exemplary embodiments, the feature pyramid E1 is configured to operate as a feature extractor.

In some exemplary embodiments, the feature pyramid E1 may e.g. comprise a plurality of convolution layers for providing the plurality of, for example hierarchical, feature maps FM.

In some exemplary embodiments, the feature pyramid E1 may e.g. be based on, e.g. be similar or identical to, the structure depicted by FIG. 3 of arXiv:1612.03144v2 [cs.CV] 19 Apr. 2017 ("Feature Pyramid Networks for Object Detection").

In some exemplary embodiments, other topologies for the feature pyramid E1 are also possible.

Elements E2-1, . . . , E2-*n*, . . . of FIG. 5 symbolize blocks configured to determine, e.g. similar or identical to block 122 of FIG. 4, a plurality of (presently k many) latent variables $w^1, \ldots, w^k$. In some exemplary embodiments the various blocks E2-1, . . . , E2-*n*, . . . receive feature maps FM of different hierarchy level and provide the latent variables $w^1, \ldots, w^k$, e.g. values of the latent variables $w^1, \ldots, w^k$, based thereon, e.g. for output to the generator 14*a*. In other words, in some exemplary embodiments, the multi-scale features of the feature pyramid E1 are respectively mapped by the blocks E2-1, . . . , E2-*n* to the latent vectors or codes $\{w^k\}$, e.g. at the corresponding scales of the generator 14*a*.

Element E3 of FIG. 5 symbolizes a noise mapper which is configured to receive at least one feature map from the feature pyramid E1 and to provide, based on the at least one feature map, the noise map ε, e.g. in accordance with block 124 of FIG. 4. In some exemplary embodiments, the noise mapper E3 is configured to predict the noise map ε at an intermediate (e.g., other than highest or lowest) scale of the hierarchy of the feature pyramid E1.

In some exemplary embodiments, the noise mapper E3 may e.g. comprise a stack of, e.g. 1×1, convolution layers, which is configured to take a h×w×c feature map as an input and to output a h×w×c' feature map.

Figure 7:
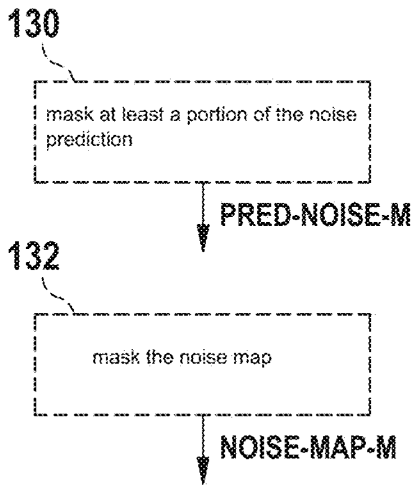
FIG. 7 schematically depicts a simplified flow-chart according to exemplary embodiments of the present invention.

In some exemplary embodiments, FIG. 7, the method comprises: randomly and/or pseudo-randomly masking 130 at least a portion of the noise prediction NOISE-PRED associated with the first digital image x1, whereby a masked noise prediction NOISE-PRED-M is obtained.

In some exemplary embodiments, FIG. 7, the method comprises: masking 132 of the noise map ε (FIG. 5), e.g. in a random and/or pseudo-random fashion, whereby a masked noise map NOISE-MAP-M is obtained, which is symbolized by element $\varepsilon_m$ of FIG. 5 at an output of the masking block M, which is e.g. configured to perform the masking according to at least one of the blocks 130, 132 of FIG. 7.

In some exemplary embodiments, FIG. 5, the masked noise map $\varepsilon_m$ is output to the generator 14*a*, e.g. similar to the latent variables $w^1, \ldots, w^k$, wherein the generator 14*a* is configured, e.g. trained, to output at least one digital image based on the latent variables $w^1, \ldots, w^k$ and the masked noise map $\varepsilon_m$.

In some exemplary embodiments, the generator 14*a* of FIG. 5 may comprise one or more synthesis blocks E4-1, . . . , E4-*k* and a combiner, e.g. adder (not individually referenced in FIG. 5) to generate an output digital image based on the latent variables $w^1, \ldots, w^k$ and the masked noise map $\varepsilon_m$.

In some exemplary embodiments, the generator 14*a* may e.g. be of the StyleGAN-type or StyleGAN2-type, as e.g. described in at least one of the following papers:

a) arXiv: 2008.00951v2 [cs.CV] 21 Apr. 2021,
b) Tero Karras, Samuli Laine, Miika Aittala, Janne Hellsten, Jaakko Lehtinen, and Timo Aila; "Analyzing and improving the image quality of stylegan;" In CVPR, 2020 (also see arXiv:1912.04958v2).

As an example, in some exemplary embodiments, the generator 14*a* may comprise the architecture as exemplarily denoted by FIG. 2 (d) of publication b) mentioned above (also see arXiv:1912.04958v2).

Figure 6A:
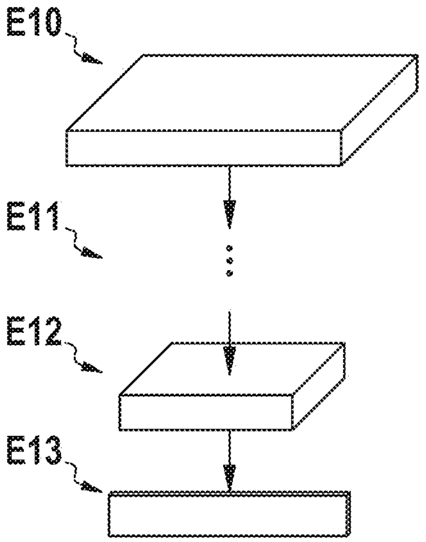
FIG. 6A schematically depicts a simplified block diagram according to exemplary embodiments of the present invention.

FIG. 6A schematically depicts an exemplary structure of at least one of the blocks E2-1, . . . , E2-*n* of FIG. 5. Element E10 symbolizes a feature map as exemplarily obtained at a certain hierarchy level by the feature pyramid E1, elements E1, E12 symbolize one or more elements, e.g. layers, of a neural network, e.g. of the convolutional neural network, CNN, –type, e.g. a fully connected CNN configured, e.g. trained, to provide a latent vector E13, in some cases e.g. also denoted as $w^i$, i=1, . . . , k, based on the feature map E10. In some exemplary embodiments, the latent vector is of the 1×1×512 type, e.g. a one-dimensional vector that comprises 512 components.

Figure 6B:
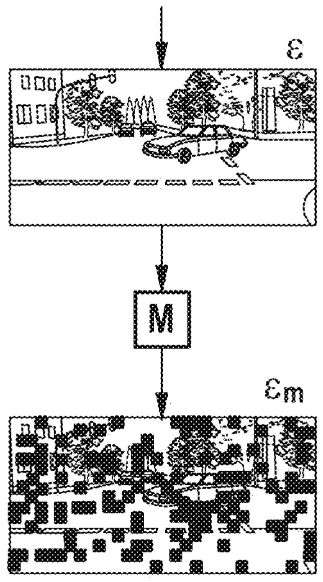
FIG. 6B schematically depicts a simplified block diagram according to exemplary embodiments of the present invention.

FIG. 6B schematically depicts a depiction of the noise map ε of FIG. 5, e.g. as obtained by block E3, the masking block M configured to perform at least one of the masking techniques of blocks 130, 132 of FIG. 7, and an exemplary depiction of the masked noise map $\varepsilon_m$.

Figure 8:
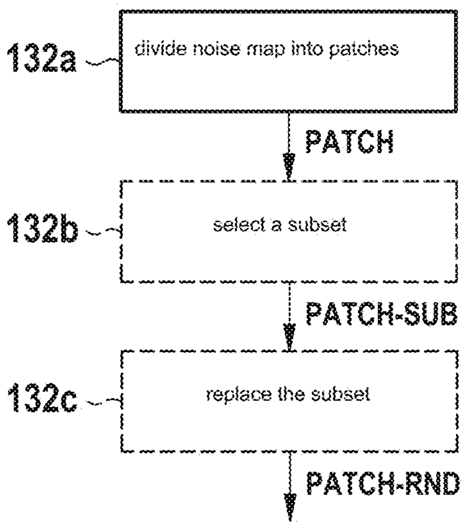
FIG. 8 schematically depicts a simplified flow-chart according to exemplary embodiments of the present invention.

In some exemplary embodiments, FIG. 8, the method comprises: dividing 132*a*, e.g. spatially dividing, the noise map ε into a plurality of, e.g. P×P many, e.g. non-overlapping, patches PATCH, selecting 132*b*, in a random and/or pseudo-random fashion, a subset PATCH-SUB of the patches PATCH, replacing 132*c* the subset PATCH-SUB of the patches PATCH by patches of, e.g. unit Gaussian, random variables PATCH-RND, e.g. of the same size. In other words, in some exemplary embodiments, some content of the noise map ε is replaced by patches of, e.g. unit Gaussian, random variables.

In some exemplary embodiments, e.g. using the encoder 12, 12*a* of the GAN system 10, a style of a digital image x1 can be modified, e.g. by changing the intermediate latents w, which characterize aspects of the style of the digital image x1.

Figure 11:
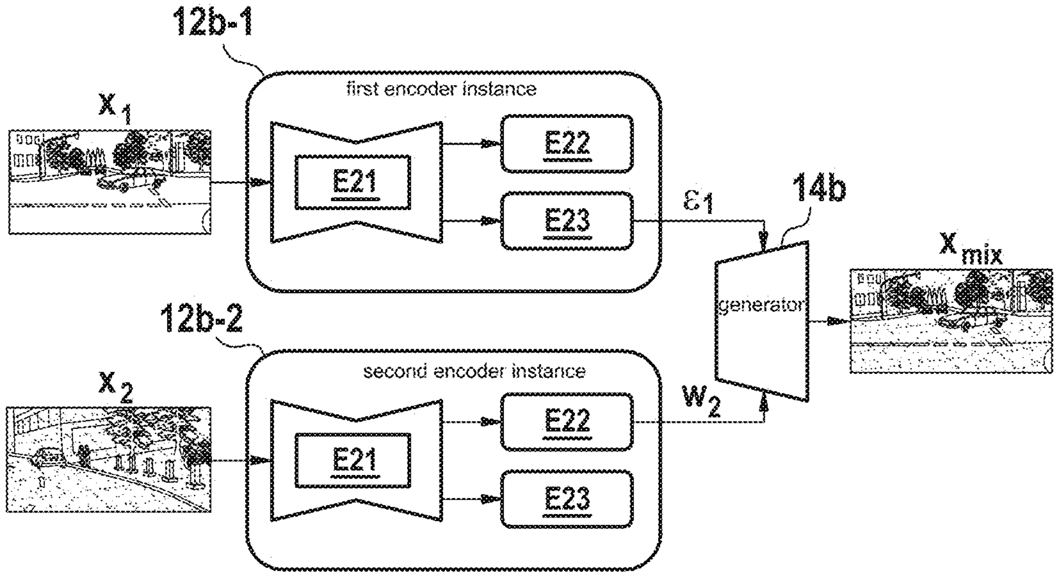
FIG. 11 schematically depicts a simplified block diagram according to exemplary embodiments of the present invention.

In this regard, FIG. 11 schematically depicts a block diagram according to further exemplary embodiments. Element $x_1$ symbolizes a first digital image that is provided to a first instance 12*b*-1 of an encoder, e.g. similar or identical to the encoder 12*a* of FIG. 5. Element $x_2$ symbolizes a second digital image that is provided to a second instance 12*b*-2 of the encoder, e.g. similar or identical to the encoder 12*a* of FIG. 5. Both instances 12*b*-1, 12*b*-2 may be provided based on the same encoder and may either be evaluated simulataneously and/or in a temporally partly overlapping or non-overlapping (e.g., sequential) fashion.

Elements E21 of FIG. 11 symbolize blocks of the encoder configured to perform feature extraction, e.g. in the form of the feature pyramid E1 of FIG. 5.

Elements E22 symbolize blocks of the encoder which are configured to determine information characterizing a style of the respective input image $x_1$, $x_2$, e.g. characterized by latent variables w as explained above, see, for example, elements $w^1, \ldots, w^k$ of FIG. 5. In some exemplary embodiments, the blocks E22 of FIG. 11 may e.g. collectively denote the blocks E2-1, . . . , E2-*k* of FIG. 5. As an example, block E22 of the encoder instance 12*b*-2 provides latent variables $w_2$ characterizing a style of the second digital image $x_2$.

Elements E23 of FIG. 11 symbolize blocks of the encoder which are configured to determine the noise map, e.g. similar or identical to block E3 of FIG. 5. As an example, block E23 of the encoder instance 12*b*-1 provides a noise map $\varepsilon_1$ based on the first digital image $x_1$.

Element 14*b* of FIG. 11 symbolizes a generator of the GAN system, e.g. similar or identical to generator 14, 14*a* of FIG. 2 or FIG. 5. Presently, the generator 14*b* of FIG. 11 determines, e.g. generates, a digital output image $x_{mix}$ comprising the content, e.g. semantic content, of the first digital image $x_1$ (as e.g. characterized by the noise map $\varepsilon_1$) and the style (e.g., texture and/or color and/or other non-semantic content) of the second digital image $x_2$ (as e.g. characterized by the latent variables $w^1, \ldots, w^k$) thus e.g. mixing contend-related and style-related aspects of the respective input images $x_1$, $x_2$.

In other words, some exemplary embodiments enable to keep, e.g. preserve, the content of the first digital image $x_1$ and to transfer the style information of the second digital image $x_2$ to the first digital image $x_1$, e.g. by combining the noise prediction $\varepsilon_1$ from the first digital image $x_1$, and the (e.g. intermediate) latent variables $w_2$ of the second digital image $x_2$. In some exemplary embodiments, the, for example fixed, generator 14*b*, e.g. of the StyleGAN-type or of the StyleGAN2-type, takes the components $\varepsilon_1$, $w_2$ as inputs and produces the mixed image $x_{mix}$.

Returning to FIG. 6B, in some exemplary embodiments propose to regularize the noise prediction of the encoder 12, 12*a*, e.g. by random masking of the noise map.

In some exemplary embodiments, and as at least partly already mentioned above, the noise map is spatially divided into nonoverlapping P×P patches PATCH (see also block 132*a* of FIG. 8), e.g. effected by the block M of FIG. 6B.

In some exemplary embodiments, e.g. based on a predefined ratio ρ, a subset PATCH-SUB of the patches is e.g. randomly selected and replaced by patches of unit Gaussian random variables $\epsilon \sim N(0, 1)$ of the same size, wherein, for example, N(0, 1) is the prior distribution of the noise map, e.g. at a training of the generator 14, 14*a* (which can e.g. be of the StyleGAN2-type).

In some exemplary embodiments, the encoder 12, 12*a* may be denoted as a "masked noise encoder", as, in some exemplary embodiments, it is trained with random masking, e.g. to predict the noise map.

In some exemplary embodiments, the proposed random masking may reduce an encoding capacity of the noise map, hence encouraging the encoder 12, 12*a* to jointly exploit the latent codes {wk} for reconstruction. In some exemplary embodiments, thus, the encoder 12, 12*a* takes the noise map and latent codes from the content and style images, respectively. In some exemplary embodiments, then, they may be fed into the generator 14, 14*a* (e.g., of the StyleGAN2-type), e.g. to synthesize a new image.

In some exemplary embodiments, if the encoder 12, 12*a* is not trained with random masking, the new image may not have, e.g. any, perceptible difference(s) with the content image. In some exemplary embodiments, this means that the latent codes {wk} encode negligible information of the image. In contrast, in some exemplary embodiments, when being trained with masking, the encoder creates a novel image that takes the content and style from two different images. In some exemplary embodiments, this observation confirms an important role of masking for content and style disentanglement according to some exemplary embodiments, and thus the, e.g. improved, style mixing capability.

In some exemplary embodiments, the noise map does not, e.g. no longer, encode(s) all perceptible information of the image, including style and content. In some exemplary embodiments, in effect, the latent codes {wk} play a more active role in controlling the style.

In the following, aspects and information related to an encoder training loss according to some exemplary embodiments are provided.

In some exemplary embodiments, the principle according to the embodiments related to GAN inversion, e.g. StyleGAN2 inversion according to some exemplary embodiments, with a masked noised encoder $E^M$ can be formulated as $\{w^1, \ldots, w^K, \varepsilon\} = E^M(x)$;

$$x^* = G \circ E^M(x) = G(w^1, \ldots, w^K, \varepsilon).$$

In some exemplary embodiments, the masked noise encoder $E^M$ maps the given image x onto the latent codes $\{w^k\}$ and the noise map ε.

In some exemplary embodiments, the generator G (see also element 14, 14*a* of FIG. 2, FIG. 5), e.g. a Style-GAN2-type generator, takes both $\{w^k\}$ and the noise map E as an input and generates the image x*. In some exemplary embodiments, e.g. ideally, x* may be identical to x, i.e., a perfect reconstruction.

In some exemplary embodiments, the encoder 12, 12, e.g. the masked noise encoder $E^M$, is trained, e.g. to reconstruct the original image x.

In some exemplary embodiments, when training the encoder 12, 12, e.g. the masked noise encoder $E^M$ to reconstruct the original image x, the original noise map ε is masked, e.g. before being fed into the, e.g. pre-trained, generator G, wherein the masking can e.g. be characterized by:

$$\varepsilon_M = (1 - M_{noise}) \odot \varepsilon + M_{noise} \odot \in,$$

$$\tilde{x} = G(w^1, \ldots, w^K, \varepsilon_M),$$

wherein $M_{noise}$ e.g. is a random binary mask, wherein ⊙ indicates the Hadamard product, and wherein $\tilde{x}$ denotes the reconstructed image with the masked noise $\varepsilon_M$.

In some exemplary embodiments, the training loss for the encoder can be characterized by $$\mathcal{L}=\mathcal{L}_{mse}+\lambda_1\mathcal{L}_{lpips}+\lambda_2\mathcal{L}_{adv}+\lambda_3\mathcal{L}_{reg},$$

where $\{\lambda_i\}$ are weighting factors. The first three terms are the pixel-wise MSE loss, learned perceptual image patch similarity (LPIPS) loss (e.g., according to Richard Zhang, Phillip Isola, Alexei A Efros, Eli Shechtman, and Oliver Wang; "The unreasonable effectiveness of deep features as a perceptual metric;" In CVPR, 2018) and adversarial loss (e.g., according to Ian Goodfellow, Jean Pouget-Abadie, Mehdi Mirza, Bing Xu, DavidWarde-Farley, Sherjil Ozair, Aaron Courville, and Yoshua Bengio; "Generative adversarial nets;" in NeurIPS, 2014):

$$\mathcal{L}_{mse}=\|(1-M_{img})\odot(x-\tilde{x})\|_2,$$

$$\mathcal{L}_{lpips}=\|(1-M_{feat})\odot(VGG(x)-VGG(\tilde{x})\|_2,$$

$$\mathcal{L}_{adv}=-\log D(G(E^M(x))).$$

Note that, in some exemplary embodiments, masking removes the information of the given image x at certain spatial positions, the reconstruction requirement on these positions should then be relaxed. In some exemplary embodiments, $M_{img}$ and $M_{feat}$ may e.g. be obtained by up- and downsampling the noise mask $M_{noise}$ to the image size and the feature size of the, e.g. VGG-based, feature extractor.

In some exemplary embodiments, the adversarial loss is obtained by formulating the encoder training as an adversarial game with a discriminator D (also see optional element 16 of FIG. 2) that is trained to distinguish between reconstructed and real images.

In some exemplary embodiments, the last regularization term is defined as $$\mathcal{L}_{reg}=\|\varepsilon\|_1+\left\|E_w^M(G(w_{gt},\epsilon))-w_{gt}\right\|_2$$

In some exemplary embodiments, the L1 norm helps to induce sparse noise prediction. In some exemplary embodiments, it is complementary to random masking, reducing the capacity of the noise map. In some exemplary embodiments, the second term is obtained by using the ground truth latent codes $w_{gt}$ of synthesized images $G(w_{gt}, \in)$ to train the latent code prediction $$E_w^M$$

(e.g. according to Xu Yao, Alasdair Newson, Yann Gousseau, and Pierre Hellier; "Feature-Style Encoder for Style-Based GAN Inversion," arXiv preprint, 2022). In some exemplary embodiments, it guides the encoder to stay close to the original latent space of the generator, speeding up the convergence.

Figure 9:
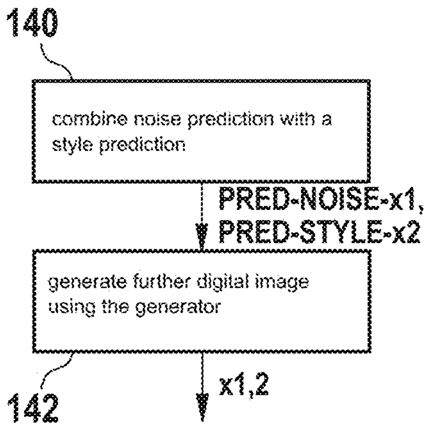
FIG. 9 schematically depicts a simplified flow-chart according to exemplary embodiments of the present invention.

In some exemplary embodiments, FIG. 9, the method comprises: combining 140 the noise prediction PRED-NOISE-x1 associated with the first digital image x1 (FIG. 2) with a style prediction PRED-STYLE-x2 of a or the second digital image x2 (e.g., characterized by latent variables associated with the second digital image x2), generating 142 a further digital image x12 using the generator 14*a* (FIG. 5) based on the combined noise prediction associated with the first digital image x1 and the style prediction PRED-STYLE-x2 of the second digital image x2. In some exemplary embodiments, this enables to provide the further digital image(s) x12 with the style, or, for example, with at least some aspects of the style, of the second digital image x2, and, e.g., with the content of the first digital image x1.

Figure 10:
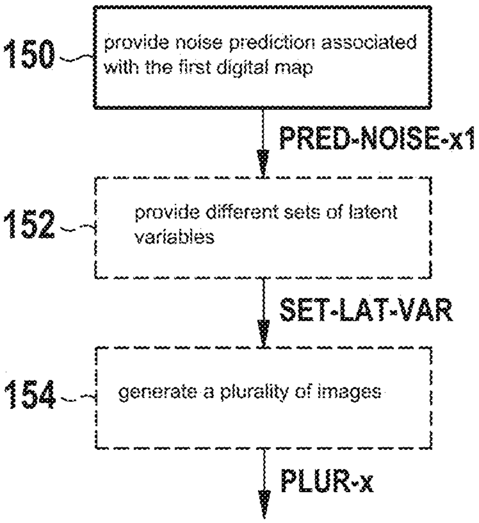
FIG. 10 schematically depicts a simplified flow-chart according to exemplary embodiments of the present invention.

In some exemplary embodiments, FIG. 10, the method comprises: providing 150 the noise prediction PRED-NOISE-x1 associated with the first digital image x1, providing 152 different sets of latent variables SET-LAT-VAR characterizing different styles to be applied to a, for example semantic, content of the first digital image x1, generating 154 a plurality PLUR-x of digital images with the different styles using the generator 14*b* (FIG. 5) based on the noise prediction PRED-NOISE-x1 associated with the first digital image x1 and the different sets SET-LAT-VAR of latent variables characterizing the different styles.

In some exemplary embodiments, there are multiple ways to obtain style information from one or more digital images and/or data sets. For example, as exemplarily shown in FIG. 17A, 17B, considering a sunny day scene as a source domain SD, the styles can be extracted from the training set of the source domain SD using the principle according to the embodiments. In exemplary embodiments, advantageously, this does not require extra information, e.g. from other datasets, as it can be interpreted as maximizing a usage of information in the existing data (set). Bracket BR1 of FIG. 17A, 17B symbolizes a style, bracket BR2 of FIG. 17A, 17B symbolizes content, and bracket TD symbolizes various target domains.

Figure 17A:
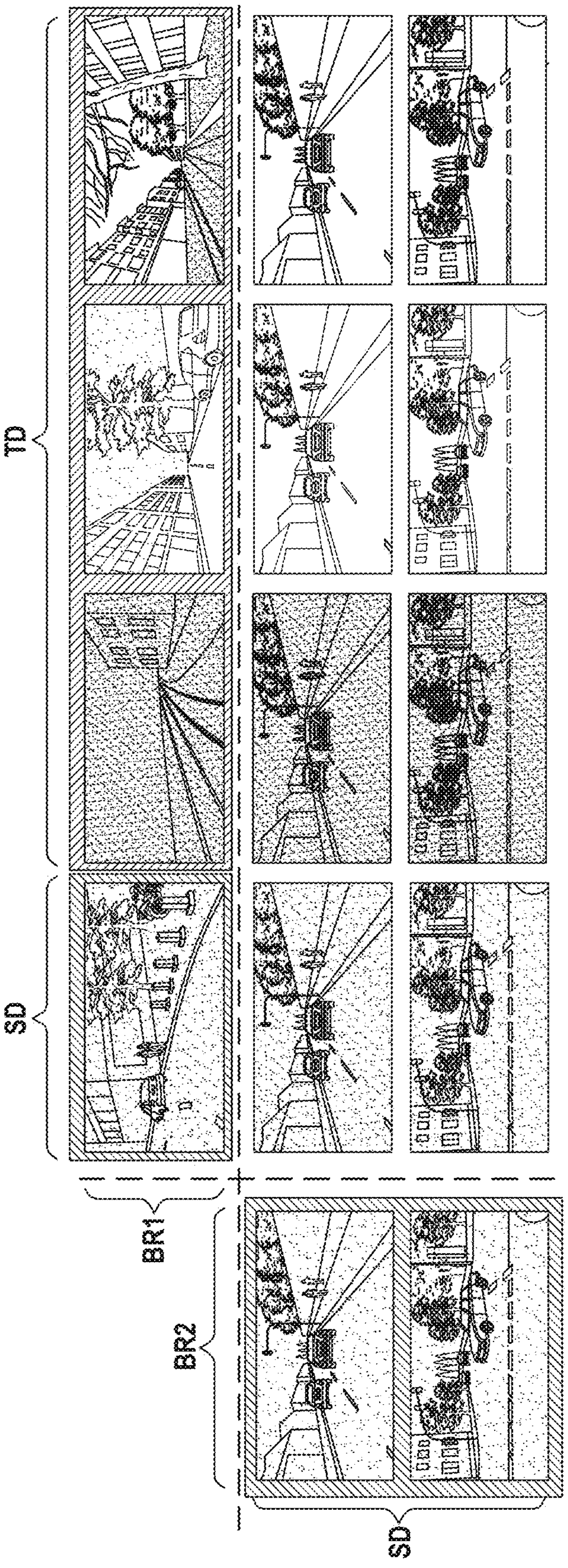
FIG. 17A schematically depicts image data according to exemplary embodiments of the present invention.
Figure 17B:
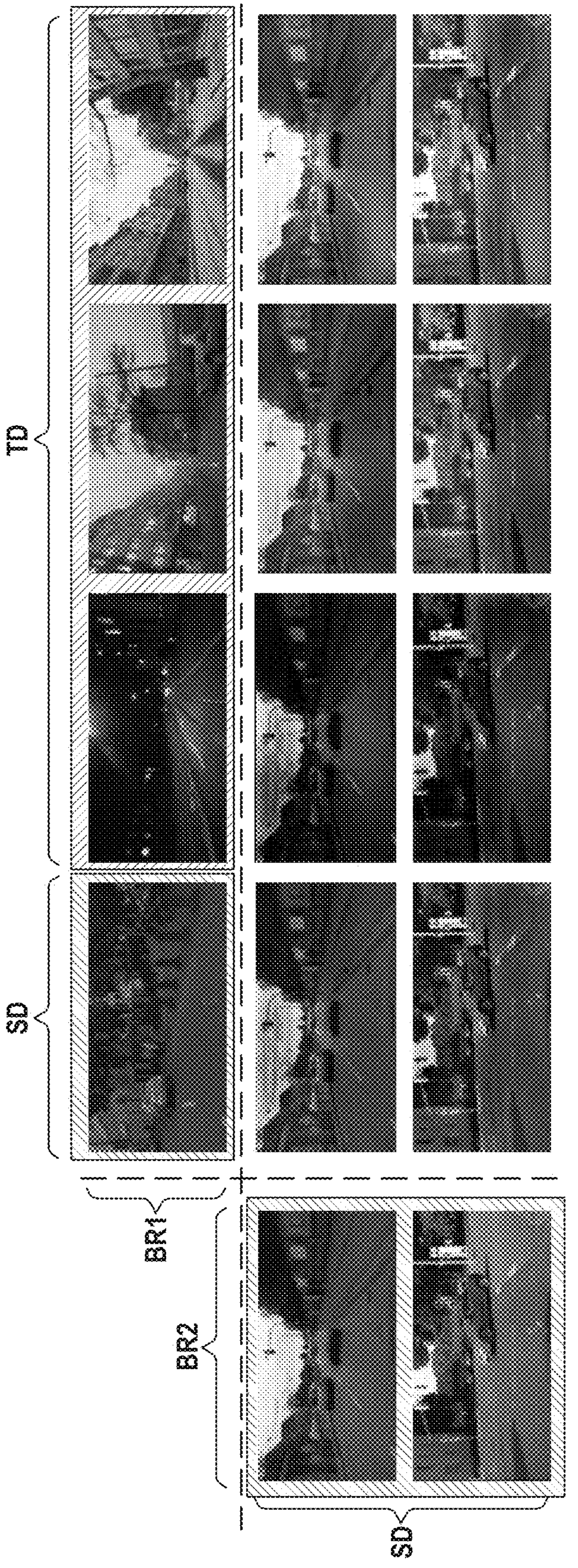
FIG. 17B schematically depicts an optional, exemplary color version of FIG. 17A according to exemplary embodiments of the present invention.

In some exemplary embodiments, one, e.g. single, e.g. unlabeled, image from a target domain TD (FIG. 17A, 17B), e.g., "night", "foggy" or "snowy" scenes may be used, its style may e.g. be transferred to the source domain SD, which is depicted by the second to fourth columns (denoted with reference sign TD) of FIG. 17A, 17B, respectively.

In some exemplary embodiments, styles extracted e.g. from one or more digital images, e.g. based on the principle according to the embodiments, can also be interpolated. As exemplarily shown in FIG. 18, an original digital image x-a is in the (horizontal) middle, which will e.g. provide the content information. Two further digital images x-b, x-c are provided at the left and right side of FIG. 18, respectively. Bracket x-ab denotes three digital images with interpolated styles based on the images x-a, x-b, and bracket x-ac denotes three digital images with interpolated styles based on the images x-a, x-c. As can be seen, the content information for the interpolated images x-ab, x-ac is provided by the digital image x-a, whereas the respective style information for the interpolated images x-ab, x-ac is provided by the further images x-b, x-c.

Figure 12:
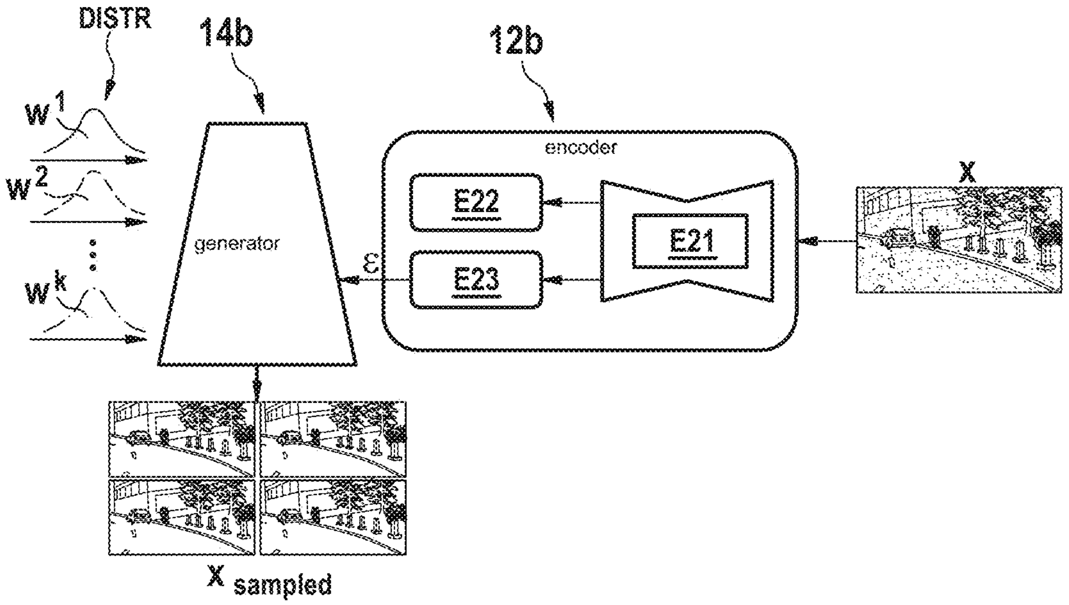
FIG. 12 schematically depicts a simplified block diagram according to exemplary embodiments of the present invention.

In some exemplary embodiments, as illustrated by FIG. 12, a distribution DISTR of a given dataset may be learned. In some exemplary embodiments, one Gaussian distribution can e.g. be fitted, e.g. at each scale $w^i$; i=1, . . . , k in the $\mathcal{W}^+$ space respectively, based on the latent w prediction of the given source dataset. In some exemplary embodiments, afterwards, e.g. given one specific digital image x, the noise prediction, e.g. noise map, ε may be determined and may e.g. be combined with styles that are sampled from the regressed (or otherwise determined), e.g. Gaussian, distribution DISTR. This way, in some exemplary embodiments, numerous source-like (e.g., regarding semantic content) sample images $x_{sampled}$ can be generated, e.g. with well-preserved semantic content from the given image x. In some exemplary embodiments, the source dataset is not necessarily the one that the encoder 12, 12*a*, 12*b* is trained on.

Figure 13:
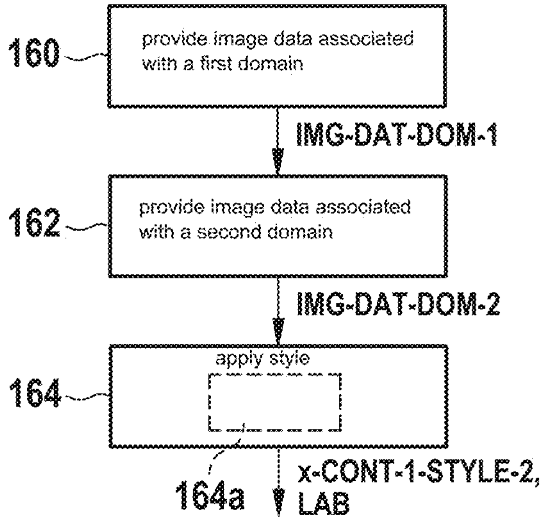
FIG. 13 schematically depicts a simplified flow-chart according to exemplary embodiments of the present invention.

In some exemplary embodiments, FIG. 13, the method comprises: providing 160 image data IMG-DAT-DOM-1, e.g. comprising one or more digital images, associated with a first domain DOM-1 (FIG. 14), providing 162 (FIG. 13) image data IMG-DAT-DOM-2, e.g. comprising one or more digital images, associated with a second domain DOM-2, applying 164 a style STYLE-2 of the second domain DOM-2 to the image data IMG-DAT-DOM-1 associated with the first domain DOM-1, wherein image data, e.g. in the form of one or more digital "style-mixed" images x-CONT-1-STYLE-2, is obtained.

In some exemplary embodiments, FIG. 13, the image data IMG-DAT-DOM-1 associated with the first domain DOM-1 comprises labels LAB, wherein, for example, the applying 164 of the style of the second domain to the image data associated with the first domain comprises preserving 164*a* the labels LAB. This way, a style of the digital images of the first domain may be modified while at the same time preserving the labels LAB, thus providing further labeled image data x-CONT-1-STYLE-2 with different style(s).

In some exemplary embodiments, the style-mixed images x as e.g. obtained according to at least one of FIG. 11, FIG. 12, FIG. 13 (or according any other of the exemplary embodiments explained above) can be used, e.g., for data augmentation, e.g. during training of a machine learning system, e.g. comprising one or more neural networks.

Figure 14:
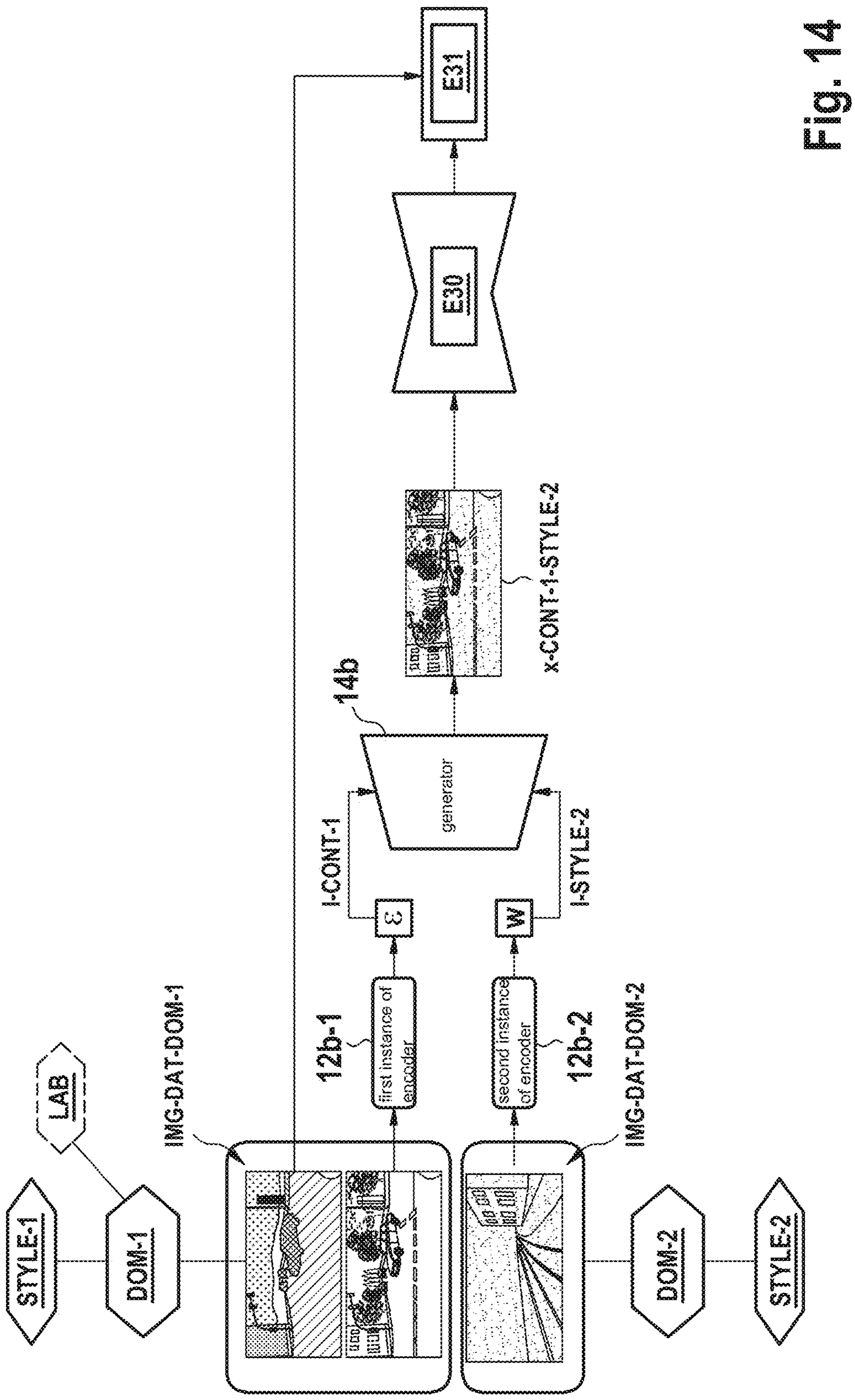
FIG. 14 schematically depicts a simplified block diagram according to exemplary embodiments of the present invention.

For instance, FIG. 14 illustrates an exemplary use case for training a semantic segmentation network E30 according to exemplary embodiments. Element E31 symbolizes a training loss.

Figure 15:
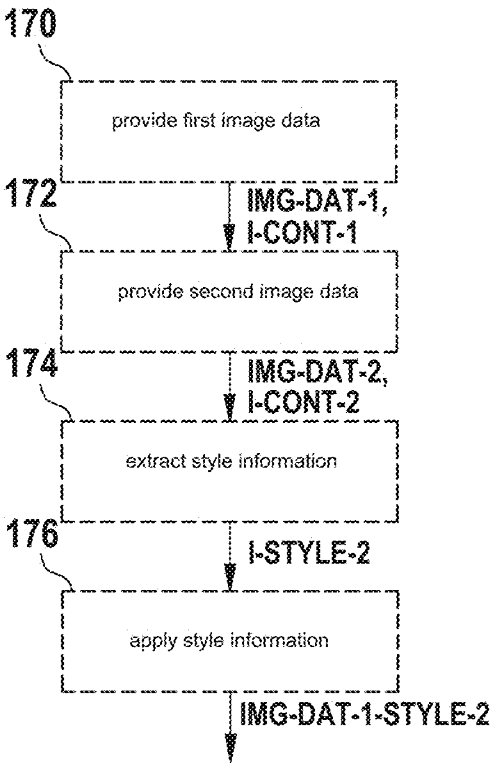
FIG. 15 schematically depicts a simplified flow-chart according to exemplary embodiments of the present invention.

In some exemplary embodiments, FIG. 15, the method comprises: providing 170 first image data IMG-DAT-1 having first content information I-CONT-1 (which can e.g. be determined by encoder instance 12*b*-1 of FIG. 14), providing 172 second image data IMG-DAT-2, wherein for example the second image data IMG-DAT-2 comprises second content information I-CONT-2 different from the first content information I-CONT-1, extracting 174 style information I-STYLE-2 of the second image data IMG-DAT-2, applying 176 at least a part of the style information I-STYLE-2 of the second image data IMG-DAT-2 to the first image data IMG-DAT-1, e.g. by using the encoder 14*b* of FIG. 14.

Since according to exemplary embodiments, the content information I-CONT-1 remains unchanged, e.g. during the processing using the generator 14*b*, the labels LAB of the first domain or source domain DOM-1 may be used and they are preserved throughout the generation of style-mixed images x-CONT-1-STYLE-2. In some exemplary embodiments, style information of digital images can e.g. be translated from any target domain(s), e.g. without labels. Such data augmentation according to exemplary embodiments can e.g. be helpful for improving generalization performance.

For example, in some exemplary embodiments, a (machine learning) model trained solely on day scenes (i.e., one single, specific domain or style) may perform badly on other scenes, such as e.g. night scenes. With the proposed style-mixing data augmentation according to exemplary embodiments, a performance gap between day scenes and night scenes may be largely reduced.

Interestingly, in some exemplary embodiments, it can be observed that style mixing within a source domain can improve, e.g. boost, an out-of-domain ("ood") generalization, e.g. without access to more datasets. In some exemplary embodiments, it is hypothesized that an intra-mix stylization according to some exemplary embodiments can be helpful, e.g. for finding a near solution, e.g. of a flat optimum, which may e.g. lead to better generalization ability.

Furthermore, in some exemplary embodiments, the style-mixed images as can be obtained applying the principle according to the embodiments can also be used for validation, where the test performance can e.g. serve as a proxy indicator of generalization to select models. In some conventional approaches, there may not be a good or preferable way to pick a-priori a model with a best generalization ability given, e.g. only, a source dataset. Therefore, in some exemplary embodiments, style-mixing by applying the principle according to the embodiments may be helpful for selecting the best model, e.g. without requiring target datasets.

In some exemplary embodiments, one single, e.g. unlabeled, image can be used, e.g. is enough, e.g. for style extraction, e.g., by using the encoder 12, 12*a*, where the style can e.g. be transferred to a source dataset. Since in some exemplary embodiments, the source dataset may be labelled, the model can thus be tested on a style-mixed dataset. Based on a so determined test accuracy, in some exemplary embodiments, the model's generalization performance on the target dataset can be approximated.

Figure 16:
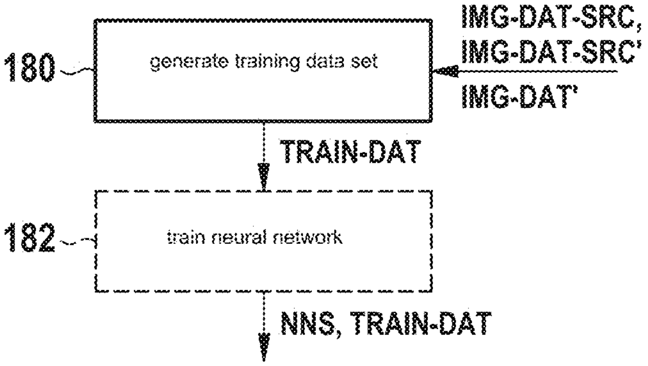
FIG. 16 schematically depicts a simplified flow-chart according to exemplary embodiments of the present invention.

In some exemplary embodiments, FIG. 16, the method comprises: generating 180 training data TRAIN-DAT (e.g., comprising one or more training data sets), e.g. for training at least one neural network and/or machine learning system, wherein the generating 180 is e.g. based on image data IMG-DAT-SRC of a source domain and based on modified image data IMG-DAT-SRC' of the source domain, wherein, for example, the modified image data IMG-DAT-SRC' is and/or has been modified with respect to an image style, e.g. according to the principle of the embodiments, for example based on a style of further image data IMG-DAT'. In some exemplary embodiments, optionally, training 182 the at least one neural network system NNS may be performed based on the training data TRAIN-DAT.

Figure 18:
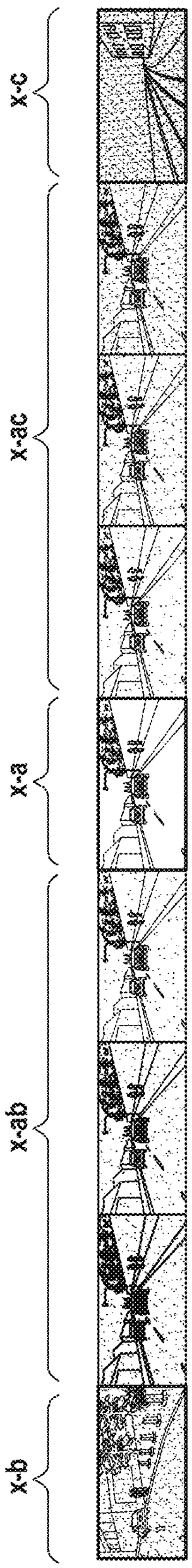
FIG. 18 schematically depicts image data according to exemplary embodiments of the present invention.

To summarize some exemplary aspects, in some exemplary embodiments, see, for example, FIG. 11 and FIG. 12, style-mixing and/or style sampling according to the principle of the embodiments are applied, e.g. to generate augmented images $x_{mix}$, $x_{sampled}$. As already explained above, FIG. 14 schematically illustrates an exemplary use case of a proposed data augmentation pipeline for semantic segmentation training. Visual examples of style mixing are e.g. presented in FIG. 17A, FIG. 17B (color version of FIG. 17A), where styles can e.g. be extracted from a training set of a source domain SD, and/or from an image, e.g. a single image, of a target domain TD. As also already explained above, images as can be obtained by an exemplary style interpolation according to some exemplary embodiments are shown in FIG. 18.

Figure 19:
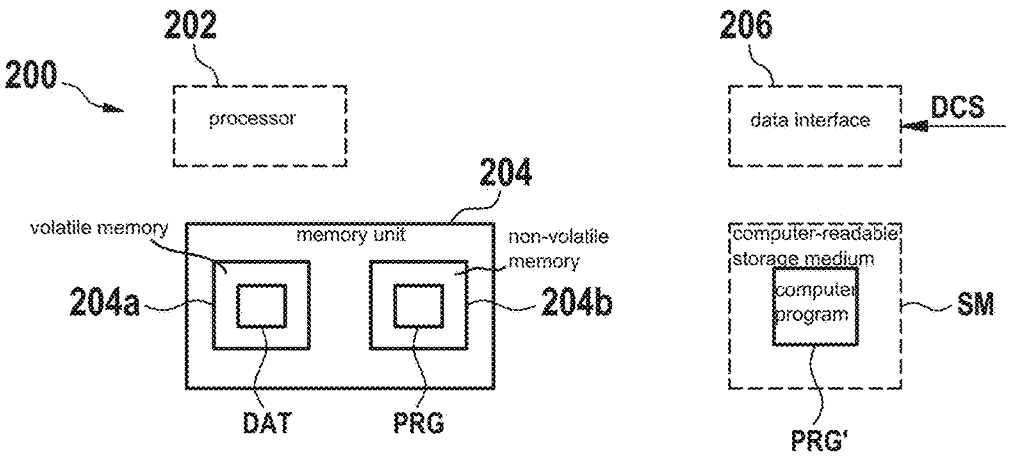
FIG. 19 schematically depicts a simplified block diagram according to exemplary embodiments of the present invention.

Further exemplary embodiments, FIG. 19, relate to an apparatus 200 for performing the method according to the embodiments.

In some exemplary embodiments, the apparatus 200 comprises at least one calculating unit, e.g. processor, 202 and at least one memory unit 204 associated with (i.e., usably by) the at least one calculating unit 202, e.g. for at least temporarily storing a computer program PRG and/or data DAT, wherein the computer program PRG is e.g. configured to at least temporarily control an operation of the apparatus 200, e.g. for implementing at least some aspects of the GAN system 10 (FIG. 2), e.g. the encoder 12 and/or the generator 14.

In some exemplary embodiments, the at least one calculating unit 202 comprises at least one core (not shown) for executing the computer program PRG or at least parts thereof, e.g. for executing the method according to the embodiments or at least one or more steps and/or other aspects thereof.

According to further exemplary embodiments, the at least one calculating unit 202 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further preferred embodiments, any combination of two or more of these elements is also possible.

According to further exemplary embodiments, the memory unit 204 comprises at least one of the following elements: a volatile memory 204*a*, e.g. a random-access memory (RAM), a non-volatile memory 204*b*, e.g. a Flash-EEPROM.

In some exemplary embodiments, the computer program PRG is at least temporarily stored in the non-volatile memory 204*b*. Data DAT, e.g. associated with at least one of: a) digital image(s), b) parameters and/or hyperparameters of the GAN system 10, c) latent variables, d) random data, e.g. for masking a noise map, e) distribution(s) DISTR, f) content information I-CONT-1, g) style information I-STYLE-2 and the like, which may e.g. be used for executing the method according to some exemplary embodiments, may at least temporarily be stored in the RAM 204*a*.

In some exemplary embodiments, an optional computer-readable storage medium SM comprising instructions, e.g. in the form of a further computer program PRG', may be provided, wherein the further computer program PRG', when executed by a computer, i.e., by the calculating unit 202, may cause the computer 202 to carry out the method according to the embodiments. As an example, the storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

In some exemplary embodiments, the apparatus 200 may comprise an optional data interface 206, e.g. for bidirectional data exchange with an external device (not shown). As an example, by means of the data interface 206, a data carrier signal DCS may be received, e.g. from the external device, for example via a wired or a wireless data transmission medium, e.g. over a (virtual) private computer network and/or a public computer network such as e.g. the Internet.

In some exemplary embodiments, the data carrier signal DCS may represent or carry the computer program PRG, PRG' according to the embodiments, or at least a part thereof.

Further exemplary embodiments relate to a computer program PRG, PRG' comprising instructions which, when the program is executed by a computer 202, cause the computer 202 to carry out the method according to the embodiments.

Figure 20:
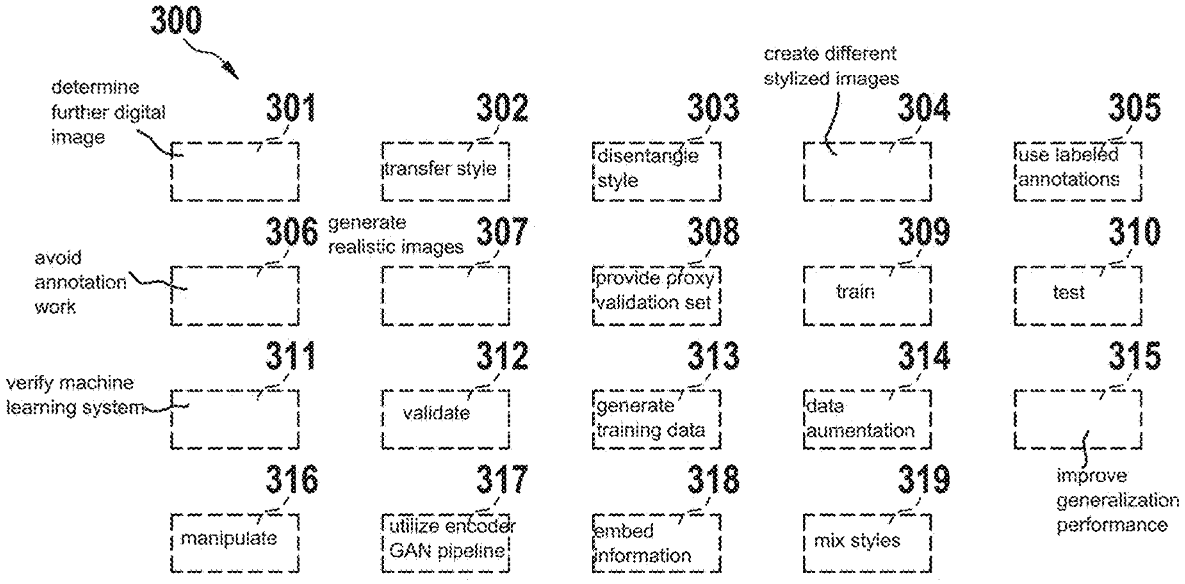
FIG. 20 schematically depicts aspects of use according to exemplary embodiments of the present invention.

Further exemplary embodiments, FIG. 20, relate to a use 30 of the method according to the embodiments and/or of the apparatus 200 according to the embodiments and/or of the computer program PRG, PRG' according to the embodiments and/or of the computer-readable storage medium SM according to the embodiments and/or of the data carrier signal DCS according to the embodiments for at least one of: a) determining 301 at least one further digital image based on the noise prediction associated with the first digital image and a plurality of latent variables associated with the extended latent space, at least some of the plurality of latent variables being associated with another image and/or other data than the first digital image, b) transferring 302 a style from a second digital image to the first digital image, e.g. while preserving a content of the first digital image, c) disentangling 303 style and content of at least one digital image, d) creating 304 different stylized digital images with unchanged content (see, for example, FIG. 18), e.g. based on the first digital image and a style of at least one further, e.g. second, digital image, e) using 305, e.g. re-using, labelled annotations for stylized images, f) avoiding 306 annotation work when changing a style of at least one digital image, g) generating 307, e.g. perceptually realistic, digital images, e.g. with different styles, h) providing 308 proxy validation set, e.g. for testing out-of-distribution generalization, e.g. of a neural network system, i) training 309 a machine learning system, j) testing 310 a machine learning system, k) verifying 311 a machine learning system, l) validating 312 a machine learning system, m) generating 313 training data, e.g. for a machine learning system, n) data 314 augmentation, e.g. of existing image data, o) improving 315 a generalization performance of a machine learning system, p) manipulating 316, e.g. flexibly manipulating, image styles, e.g. without a training associated with multiple data sets, q) utilizing 317 an encoder GAN pipeline 12, 14 to manipulate image styles, r) embedding 318, by the encoder 12, information associated with an image style into, for example intermediate, latent variables, s) mixing 319 styles of digital images, e.g. for generating at least one further digital image comprising a style based on the mixing.

In the following, further aspects and advantages according to further exemplary embodiments are provided, which, in some exemplary embodiments, may be combined with each other and/or with at least one of the exemplary aspects explained above.

In some conventional approaches, the i.i.d (independent and identically distributed) assumption has been made for deep learning, i.e., training and test data such as e.g. digital images should be drawn from the same distribution. However, in real life, the i.i.d assumption can be easily violated. For example, different weather conditions, different cities can cause distribution shifts. In at least some conventional approaches, such data shifts can lead to severe performance degradation. In at least some conventional approaches, unsupervised domain adaptation or domain generalization aims to mitigate this issue.

In some conventional approaches, data augmentation techniques such as e.g. color transformation and CutMix (https://arxiv.org/pdf/1912.04958.pdf) are proposed, which can modify randomly an appearance of a dataset, but which cannot transfer appearances/styles of another dataset to a source dataset. In some conventional approaches, Image to Image Translation for Domain Adaptation can do such targeted translation, but requires the image-to-image translation model to be trained on both source and target domain.

In some exemplary embodiments, the principle according to the embodiments can e.g. be seen and/or used as an enhancement to Encoder-GAN architectures, such as "Encoding in Style: a StyleGAN Encoder for Image-to-Image Translation (pSp)" (https://arxiv.org/pdf/2008.00951.pdf). Particularly, and in contrast to the conventional approaches, the principle according to the embodiments can flexibly manipulate image styles, e.g. without multi-dataset training. In some exemplary embodiments, the images, e.g. synthesized images, as obtained by applying the principle according to the embodiments can be used for data augmentation during network training, e.g. to improve model generalization performance.

In some exemplary embodiments, stylized images as e.g. obtained by applying the principle according to the embodiments can be used for validation, e.g. to indicate a model's out-of-distribution (ood) generalization capability.

In some exemplary embodiments, an Encoder-GAN pipeline is used to manipulate image styles. In some exemplary embodiments, it can be observed that a, for example properly, trained encoder can disentangle style and content information in an unsupervised manner. More specifically, in some exemplary embodiments, the encoder can embed style information into intermediate latent variables and content information into noises. Moreover, in some exemplary embodiments, this pipeline generalizes well to unseen datasets.

In some exemplary embodiments, taking advantage of these appealing properties of the encoder GAN pipeline related to the principle according to the embodiments, multiple applications, e.g. to manipulate image styles and/or further usages, e.g. during training and/or validation are proposed.

In some exemplary embodiments, the principle according to the embodiments enables to transfer styles of other datasets to a source dataset and to generate stylized images with well-preserved content information of the original images.

In some exemplary embodiments, the principle according to the embodiments enables to interpolate styles and/or to learn a style distribution and to sample from the style distribution. In some exemplary embodiments, the stylized images as obtained by applying the principle according to the embodiments can e.g. be used for data augmentation, e.g. during training.

In some exemplary embodiments, the stylized images as obtained by applying the principle according to the embodiments can e.g. be used as proxy validation sets, e.g. for out-of-distribution (ood) data, where the test accuracy on stylized synthetic images can predict the ood generalization performance to a certain extent. In some exemplary embodiments, this can be useful for model selection. For example, for a model trained on sunny day scenes (source domain), night, foggy, snowy and any scenes under other different weather conditions are considered as ood samples. In some exemplary embodiments, styles of the ood samples can be transferred to the source domain while preserving the content of the source images. In some exemplary embodiments, since source domain images may be labelled, models can be tested on stylized source images, and the test accuracy can indicate the model's ood generalization ability.

In some exemplary embodiments, e.g. thanks to the style-content disentanglement of the encoder 12, 12*a*, exemplary embodiments enable to generate different stylized images while the content of the images remains unchanged, e.g. the same content as in the original image. Thus, in some exemplary embodiments, labelled annotations of the original images can also be used for the stylized images.

In some conventional approaches, when drawing samples from a distribution that is not covered by existing data, the gathered samples are required to be labeled, which is not the case with exemplary embodiments due to preserving the labels. Thus, in some exemplary embodiments, time and/or costs, e.g. for an additional annotation work, can be saved.

Further, in some exemplary embodiments, the style-mixed images as may be obtained by applying the principle of the embodiments are perceptually realistic and e.g. close to the target datasets. Therefore, in some exemplary embodiments, they can be used as a proxy validation set for testing out-of-distribution generalization.

In some exemplary embodiments, an Encoder-GAN pipeline according to the principle of the embodiments does not require training on the target datasets, e.g. like some conventional image-to-image translation methods. In some exemplary embodiments, a single dataset trained model generalizes well to unseen datasets, which enables more flexible style mixing and manipulation.

In some exemplary embodiments, the principle of the embodiments can e.g. be used for at least one of: training a machine learning (ML) system, generating training data for this training, generating test data, e.g. to check whether the trained ML system can then be safely operated.

In some exemplary embodiments, aspects of the embodiments relate to and/or characterize a generative model, e.g. to generate training or test data, and to a method to train the generative model.

In some exemplary embodiments, the principle according to the embodiments may e.g. be used for at least one of, but not limited to: a) data analysis, e.g. analysis of digital image and/or video data, b) classifying digital image data, c) detecting the presence of objects in the data, d) performing a semantic segmentation on the data, e.g. regarding at least one of, but not limited to: d1) traffic signs, d2) road surfaces, d3) pedestrians, d4) vehicles, d5) object classes that may e.g. show in a semantic segmentation task, e.g., trees, sky, . . . .

What is claimed is:

1. A computer-implemented method of processing digital image data, comprising the following steps:

determining, by an encoder configured to map a first digital image to an extended latent space associated with a generator of a generative adversarial network (GAN) system, a noise prediction associated with the first digital image;

determining, by the generator of the GAN system, at least one further digital image based on the noise prediction associated with the first digital image and a plurality of latent variables associated with the extended latent space;

determining a plurality of hierarchical feature maps from the first digital image, wherein the determination of the at least one further digital image is based on the plurality of hierarchical feature maps; and determining an additive noise map based on the plurality of hierarchical feature maps, wherein the determination of the at least one further digital image is based additionally on the additive noise map.

2. The method according to claim 1, further comprising: randomly and/or pseudo-randomly masking at least a portion of the noise prediction associated with the first digital image.

3. The method according to claim 1, further comprising: masking of the noise map in a random and/or pseudo-random fashion.

4. The method according to claim 3, further comprising:

spatially dividing the noise map into a plurality of, non-overlapping patches;

selecting, in a random and/or pseudo-random fashion, a subset of the patches; and replacing the subset of the patches by patches of unit Gaussian random variables of the same size.

5. The method according to claim 1, further comprising: combining the noise prediction associated with the first digital image with a style prediction of a second digital image; and generating a further digital image using the generator based on the combined noise prediction associated with the first digital image and the style prediction of the second digital image.

6. The method according to claim 5, further comprising: providing first image data having first content information;

providing second image data of the second digital image, wherein the second image data includes second content information different from the first content information;

extracting the style prediction from the second image data; and applying at least a part of the style information of the second image data to the first image data, wherein the applying includes the combining.

7. The method according to claim 1, further comprising: providing the noise prediction associated with the first digital image;

providing different sets of latent variables characterizing different styles to be applied to a semantic content of the first digital image; and generating a plurality of digital images with the different styles using the generator based on the noise prediction associated with the first digital image and the different sets of latent variables characterizing the different styles.

8. The method according to claim 7, further comprising: generating training data for training at least one neural network system, wherein:

the generating is based on image data of a source domain and based on modified image data of the source domain; and the modified image data:

is and/or has been modified with respect to an image style, based on a style of further image data; and is generated using the different sets of latent variables characterizing the different styles, the latent variables being determined based on hierarchical feature maps of the digital images; and training the at least one neural network system based on the training data.

9. The method according to claim 1, further comprising using the method for at least one of the following:

a) determining at least one further digital image based on the noise prediction associated with the first digital image and the plurality of latent variables associated with the extended latent space, at least some of the plurality of latent variables being associated with another image and/or other data than the first digital image, b) transferring a style from a second digital image to the first digital image, while preserving a content of the first digital image, c) disentangling style and content of at least one digital image, d) creating different stylized digital images with unchanged content, based on the first digital image and a style of at least one further second digital image, e) using or re-using labelled annotations for stylized images, f) avoiding annotation work when changing a style of at least one digital image, g) generating perceptually realistic, digital images with different styles, h) providing proxy validation sets for testing out-of-distribution generalization of a neural network system, i) training a machine learning system, j) testing a machine learning system, k) verifying a machine learning system, l) validating a machine learning system, m) generating training data for a machine learning system, n) data augmentation of existing image data, o) improving a generalization performance of a machine learning system, p) flexibly manipulating image styles without a training associated with multiple data sets, q) utilizing an encoder GAN pipeline to manipulate image styles, r) embedding, by the encoder, information associated with an image style into intermediate latent variables, s) mixing styles of digital images for generating at least one further digital image including a style based on the mixing.

10. The method according to claim 1, further comprising determining the plurality of latent variables associated with the extended latent space for the first digital image based on the plurality of hierarchical feature maps.

11. The method according to claim 10, wherein at least some of the plurality of latent variables determined from the plurality of hierarchical maps characterize at least one of the following aspects of the first digital image:

a) a style including a non-semantic appearance, b) a texture, c) a color.

12. The method according to claim 1, further comprising: providing first image data having first content information;

providing second image data corresponding to a second digital image, the second image data including second content information different from the first content information;

determining a further plurality of latent variables for the second digital image based on hierarchical feature maps determined from the second image data, wherein the further plurality of latent variables represent style information of the second digital image; and applying at least a part of the style information to the first image data.

13. An apparatus configured to process digital image data, the apparatus configured to:

determine, by an encoder configured to map a first digital image to an extended latent space associated with a generator of a generative adversarial network (GAN) system, a noise prediction associated with the first digital image;

determine, by the generator of the GAN system, at least one further digital image based on the noise prediction associated with the first digital image and a plurality of latent variables associated with the extended latent space;

determine a plurality of hierarchical feature maps from the first digital image, wherein the determination of the at least one further digital image is based on the plurality of hierarchical feature maps; and determining an additive noise map based on the plurality of hierarchical feature maps, wherein the determination of the at least one further digital image is based additionally on the additive noise map.

14. A non-transitory computer-readable storage medium on which is stored a computer program including instructions processing digital image data, the instructions, when executed by a computer, causing the computer to perform the following steps:

determining, by an encoder configured to map a first digital image to an extended latent space associated with a generator of a generative adversarial network (GAN) system, a noise prediction associated with the first digital image;

determining, by the generator of the GAN system, at least one further digital image based on the noise prediction associated with the first digital image and a plurality of latent variables associated with the extended latent space;

determining a plurality of hierarchical feature maps from the first digital image, wherein the determination of the at least one further digital image is based on the plurality of hierarchical feature maps; and determining an additive noise map based on the plurality of hierarchical feature maps, wherein the determination of the at least one further digital image is based additionally on the additive noise map.

15. A computer-implemented method of processing digital image data, comprising the following steps:

determining, by an encoder configured to map a first digital image to an extended latent space associated with a generator of a generative adversarial network (GAN) system, a noise prediction associated with the first digital image;

determining, by the generator of the GAN system, at least one further digital image based on the noise prediction associated with the first digital image and a plurality of latent variables associated with the extended latent space;

determining a plurality of hierarchical feature maps from the first digital image, wherein the determination of the at least one further digital image is based on the plurality of hierarchical feature maps; and determining, by the encoder, a further plurality of latent variables from a plurality of additional hierarchical feature maps that are determined based on a second digital image, which is different from the first digital image using the encoder, wherein the determination of the at least one further digital image is based additionally on the further plurality of latent variables.

16. The method according to claim 15, further comprising:

fitting the plurality of latent variables and the further plurality of latent variables to a plurality of probability distributions;

sampling from the plurality of distributions; and providing the samples to the generator as input representing the pluralities of latent variables corresponding to the first digital image and the second digital image.

17. The method according to claim 1, further comprising:

providing image data, including one or more digital images, associated with a first domain;

providing image data, including one or more digital images, associated with a second domain; and applying a style of the second domain to the image data associated with the first domain, wherein the applying is based on:

the latent variables, which are determined from the hierarchical feature maps of the first digital image; and/or further latent variables determined from hierarchical feature maps of images of the second domain.

18. The method according to claim 17, wherein the image data associated with the first domain include labels, wherein the applying of the style of the second domain to the image data associated with the first domain includes preserving the labels.

* * * * *